(12) United States Patent
Moon

(10) Patent No.: US 11,360,510 B2
(45) Date of Patent: Jun. 14, 2022

(54) COVERS FOR ELECTRONIC DEVICES

(71) Applicant: Hewlett-Packard Development Company, L.P., Spring, TX (US)

(72) Inventor: Philip Moon, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/047,184

(22) PCT Filed: Jun. 5, 2018

(86) PCT No.: PCT/US2018/036047
§ 371 (c)(1),
(2) Date: Oct. 13, 2020

(87) PCT Pub. No.: WO2019/236066
PCT Pub. Date: Dec. 12, 2019

(65) Prior Publication Data
US 2021/0149446 A1 May 20, 2021

(51) Int. Cl.
*G06F 1/16* (2006.01)
*H05K 5/00* (2006.01)

(52) U.S. Cl.
CPC .......... *G06F 1/1628* (2013.01); *G06F 1/1662* (2013.01); *G06F 2200/1633* (2013.01)

(58) Field of Classification Search
CPC .... G06F 1/1616; G06F 1/1618; G06F 1/1628; G06F 1/1662; G06F 2200/1633
USPC .................................................. 361/679.55
See application file for complete search history.

(56) References Cited

U.S. PATENT DOCUMENTS

| | | | |
|---|---|---|---|
| 6,307,741 B1 * | 10/2001 | Karidis | G06F 1/1616 |
| | | | 361/679.27 |
| 8,312,991 B2 | 11/2012 | Diebel et al. | |
| 9,603,425 B2 * | 3/2017 | Diebel | H04M 1/04 |
| 9,625,950 B1 | 4/2017 | Moore | |
| 2008/0251338 A1* | 10/2008 | Golden | A45C 5/02 |
| 2013/0016467 A1* | 1/2013 | Ku | F16M 11/10 |
| | | | 361/679.08 |
| 2013/0214661 A1 | 8/2013 | McBroom | |

FOREIGN PATENT DOCUMENTS

GB 2500315 4/2017
WO WO-2015130293 9/2015

OTHER PUBLICATIONS

ShenZhen GRT Trading Company, Sheep Leather Sleeve Case Cover Bag Protector for Lenovo Yoga Laptop, May 14, 2018, 4 pgs.

* cited by examiner

*Primary Examiner* — Adrian S Wilson
*Assistant Examiner* — Gage Crum
(74) *Attorney, Agent, or Firm* — Tong, Rea, Bentley & Kim LLC

(57) ABSTRACT

In example implementations, a cover for electronic devices is provided. The cover for electronic devices includes a first cover, a second cover, and a flexible spine coupled to the first cover and the second cover. The first cover includes a first folding groove. The second cover includes a second folding groove. The first cover folds in half along the first folding groove and the second cover folds against the second folding groove when the flexible spine is rotated into an open position.

15 Claims, 5 Drawing Sheets

COVERS FOR ELECTRONIC DEVICES

BACKGROUND

Laptop computers are portable computing devices. The laptop computer provides the convenience of full desktop computers, but packaged in a portable form factor that allows a user to travel with the laptop computer. The laptop computer may include a display and input/output devices combined into a single housing.

The housing of the laptop computer may be designed to provide a pleasant aesthetic appearance for the user. Since the laptop computers are portable, the housings can become susceptible to scratches, cracks, and the like, which can negatively affect the aesthetic appearance of the laptop computers.

DETAILED DESCRIPTION

Examples described herein provide a cover for laptop computers. As discussed above, laptop computers can be designed to have housings that provide a pleasant aesthetic appearance for the user. However, since the laptop computers are portable, the housings can become susceptible to scratches, cracks, and the like, which can negatively affect the aesthetic appearance of the laptop computers.

Some laptop computers have a clamshell housing design. The clamshell housing design can be designed to rotate 360 degrees. Some covers can be used, but may have to be removed to rotate the laptop computer a full 360 degrees. There are no covers that can remain coupled to the laptop computer for these types of clamshell housings that can rotate open 360 degrees.

Examples herein provide a cover that can be removably attached to the laptop computer. The design of the cover may allow the cover to remain attached to the laptop computer when the laptop computer is opened or closed. The cover may remain attached to the laptop computer for a full 360 degree rotation of the housing.

Figure 1:
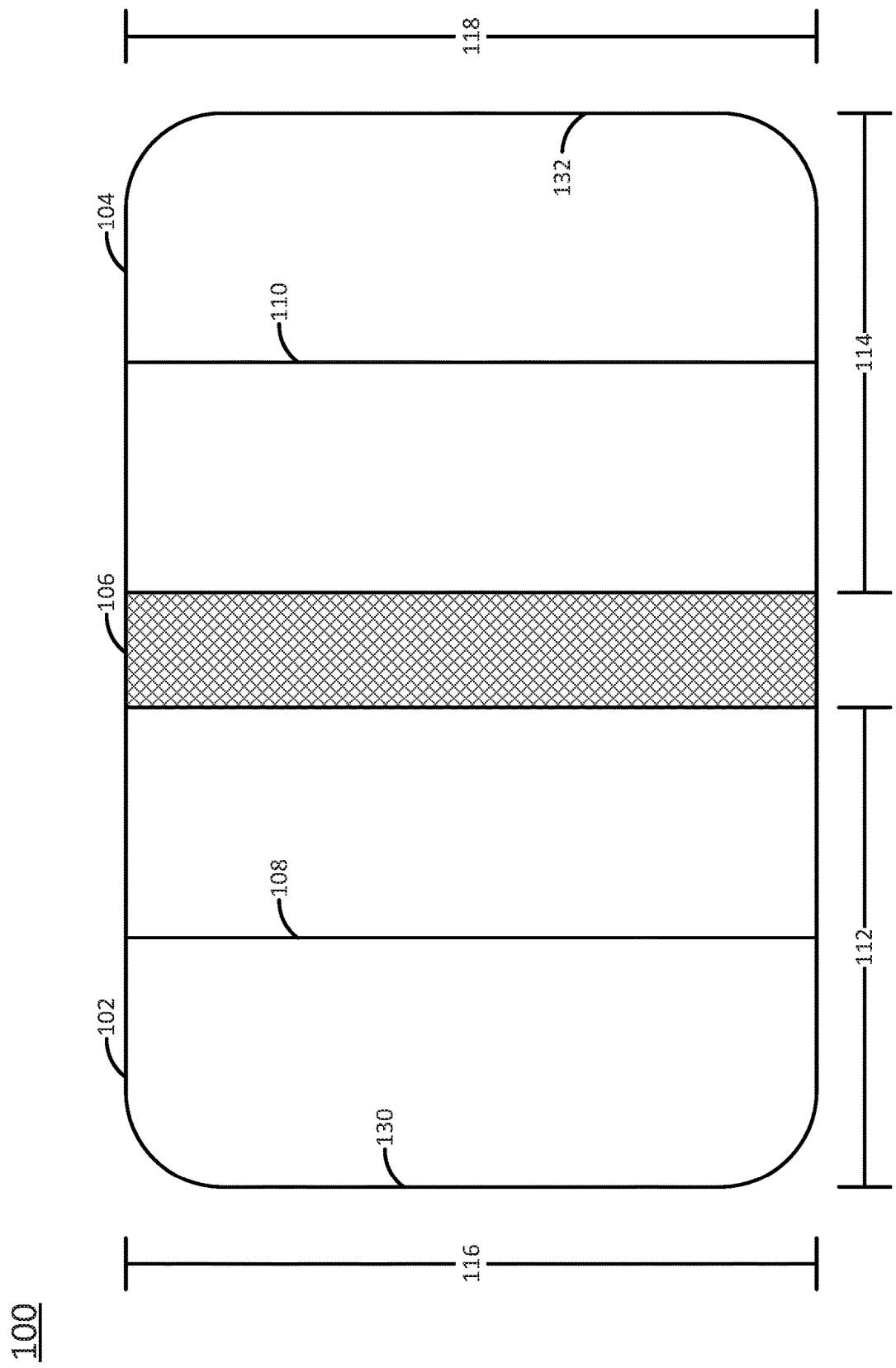
FIG. 1 is a block diagram of an outer side of an example cover for an electronic device of the present disclosure that is opened flat.

FIG. 1 illustrates a block diagram of an example of an outer side of a cover 100 for electronic devices of the present disclosure. The outer side may be a side that is seen when the cover 100 is coupled to an electronic device.

In one example, the cover 100 may include a first cover 102 and a second cover 104. The first cover 102 and the second cover 104 may be coupled via a flexible spine 106. The first cover 102 and the second cover 104 may be formed from a firm plastic covered with a soft outer shell. For example, the first cover 102 and the second cover 104 may have an outer leather shell. The soft outer shell may be colored or have a decorative design for aesthetic appeal. The flexible spine 106 may be made out of the same outer shell material without the firm plastic interior or may be an elastic material that is stitched or coupled to adjacent ends of the first cover 102 and the second cover 104.

Figure 4:
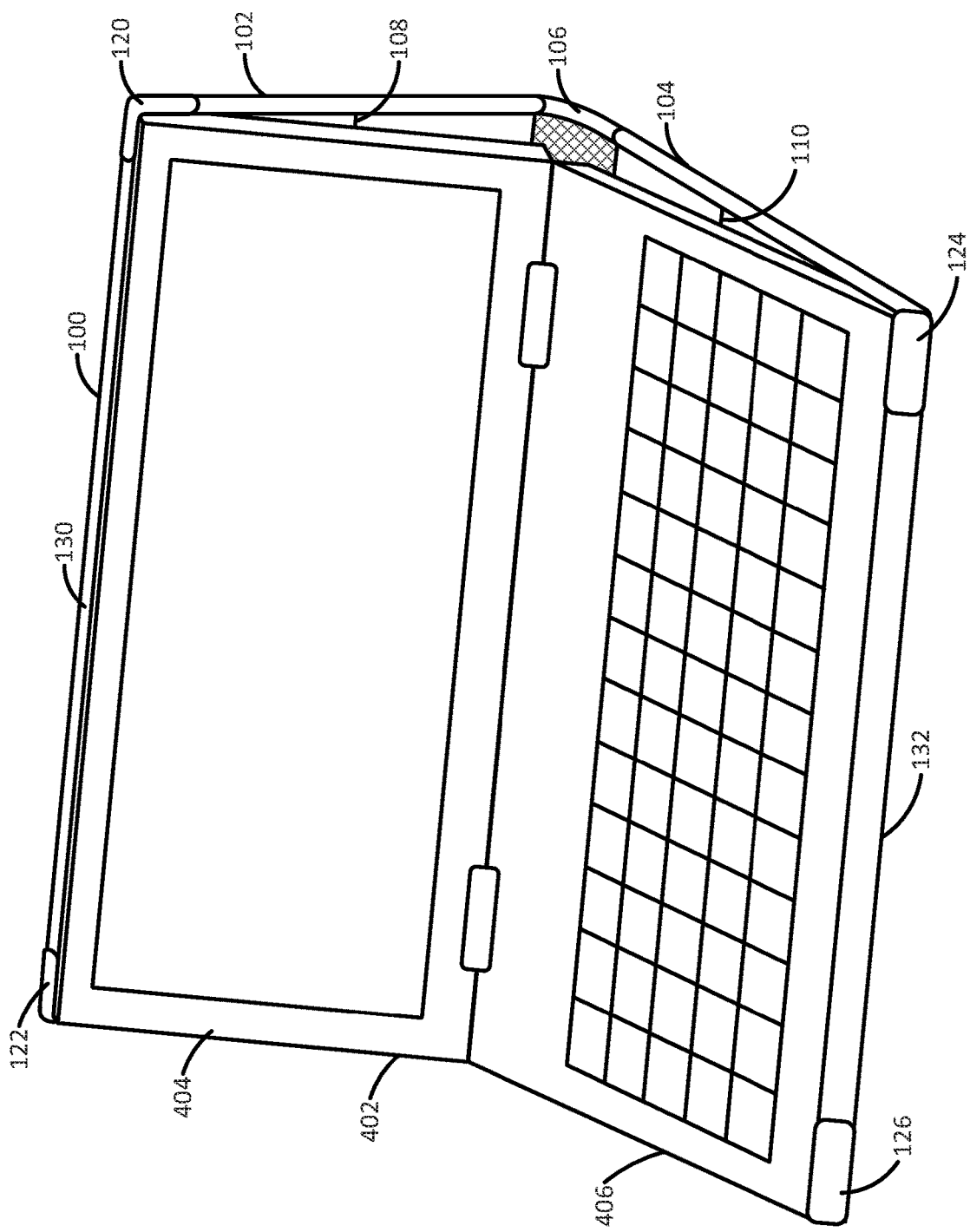
FIG. 4 is a block diagram of an isometric side view of an example cover of the present disclosure on an electronic device that is opened in a laptop mode.
Figure 5:
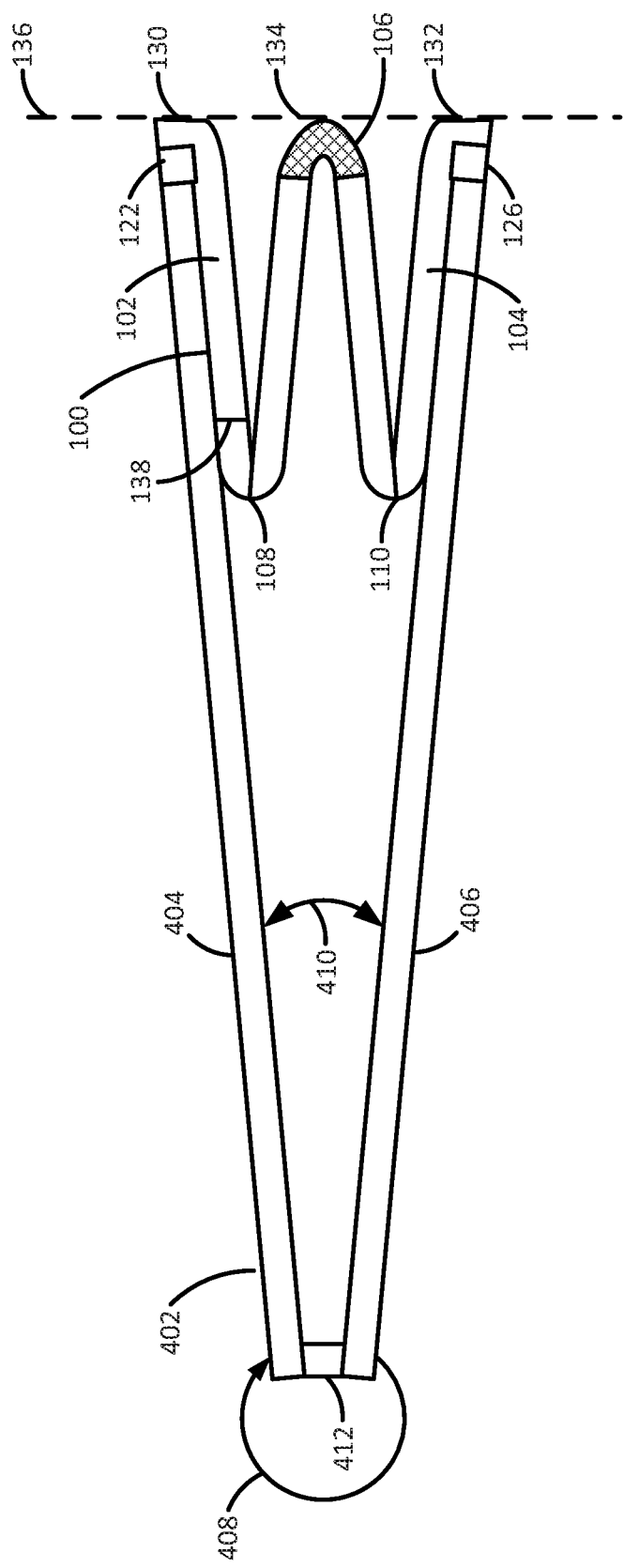
FIG. 5 is a block diagram of a side view of the example cover of the present disclosure on the electronic device that is rotated 360 degrees in an inking mode.

In one example, the first cover 102 may have a length 112, and a width 116. The length 112 and the width 116 may be approximately equal to a length and width of a display housing of an electronic device (as shown in FIGS. 4 and 5, and discussed below). The second cover 104 may have a length 114 and a width 118. The length 114 and the width 118 may be approximately equal to a length and width of a keyboard housing of the electronic device (as shown in FIGS. 4 and 5, and discussed below). In one example, the length 112 and the length 114 may be approximately equal. In one example, the width 116 and the width 118 may be approximately equal.

In one example, an outer edge 130 of the first cover 102 may be removably coupled to a front bezel of the display housing. An outer edge 132 of the second cover 104 may be removably coupled to a front bezel of the keyboard housing.

In one example, the first cover 102 may have a first folding groove 108. The second cover 104 may have a second folding groove 110. The folding grooves 108 and 110 may be formed as a flexible portion of the firm plastic material with a corresponding groove formed in the outer shell material. In one example, when the flexible spine 106 is moved into an open position, the first cover 102 may fold in half along the first folding groove 108. In addition, the second cover 104 may fold in half along the second folding groove 110.

In one example, the first folding groove 108 may be located approximately in a center of the first cover 102. In other words, the first folding groove 108 may run edge-to-edge along the width 116 of the first cover 102 and be located approximately in a middle of the length 112. Similarly, the second folding groove 110 may be located approximately in a center of the second cover 104. In other words, the second folding groove 110 may run edge-to-edge along the width 118 of the second cover 104 and be located approximately in a middle of the length 114. In other implementations, the first folding groove 108 and the second folding groove 110 may be off-center of the length 112 and 114, respectively.

Figure 2:
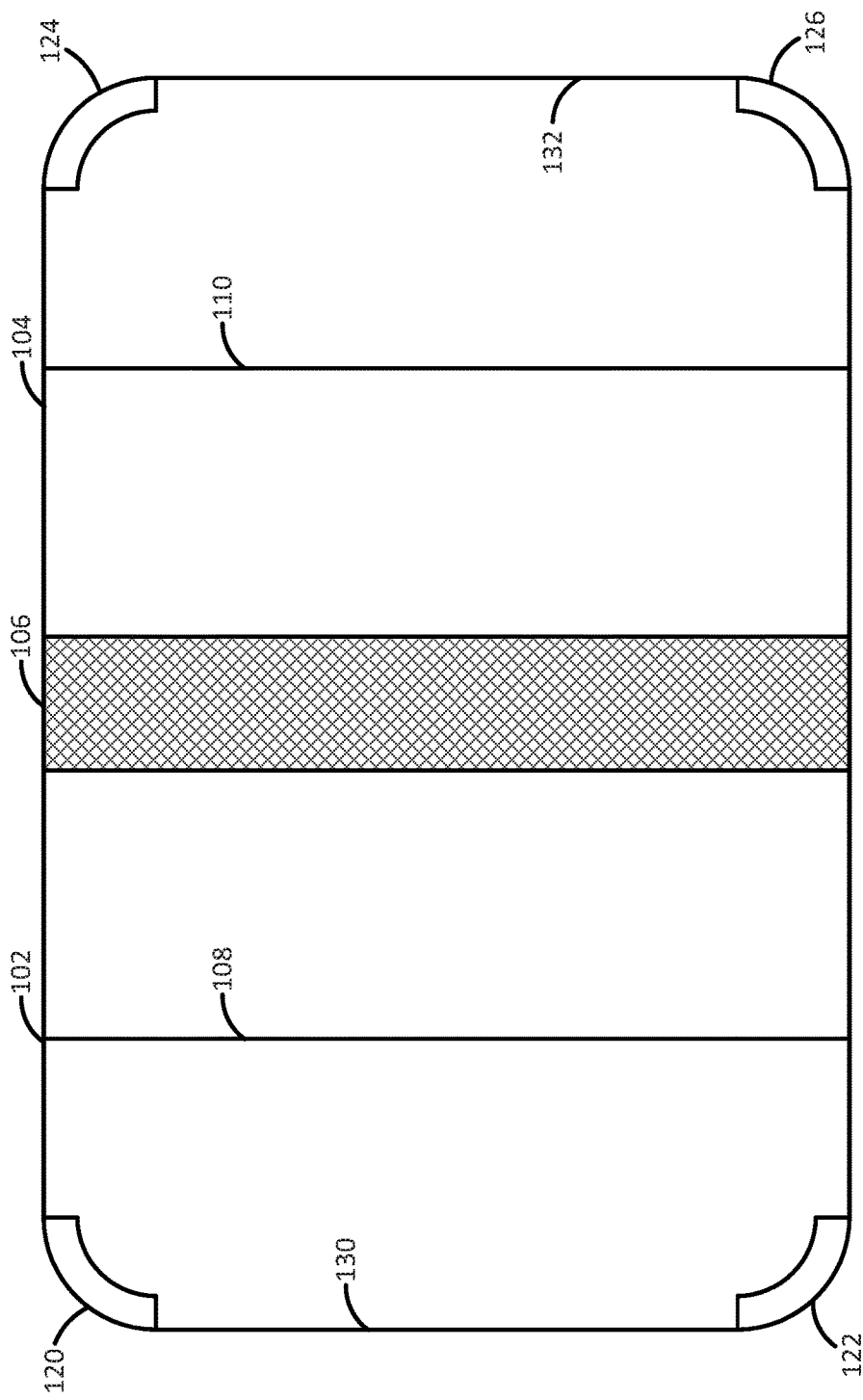
FIG. 2 is a block diagram of an inner side of the example cover for an electronic device of the present disclosure that is opened flat.

FIG. 2 illustrates a block diagram of an inner side of the cover 100 for electronic devices of the present disclosure. The inner side may be a side that is adjacent to the display housing and the keyboard housing when the cover 100 is coupled to electronic device. The first groove 108 of the first cover 102 and the second groove 110 of the second cover 104 may be seen on the inner side of the cover 100.

As noted above, the first cover 102 and the second cover 104 may be removably coupled to an electronic device. In one example, the first cover 102 and the second cover 104 may be removably coupled via an attaching mechanism. For example, the first cover 102 may have a first pair of magnets 120 and 122 and the second cover 104 may have a second pair of magnets 124 and 126.

In one example, the first pair of magnets 120 and 122 may be located on opposite corners of the outer edge 130 of the first cover 102. For example, the outer edge 130 may have a lip that runs along a bezel of the display housing. The magnets 120 and 122 may be located inside of the lip and connect to the outer bezel of the display housing of the electronic device.

Similarly, the second pair of magnets 124 and 126 may be located on opposite corners of the outer edge 132 of the second cover 104. The outer edge 132 may have a lip that runs along a bezel of the keyboard housing. The magnets 124 and 126 may be located inside of the lip and connect to the outer bezel of the keyboard housing of the electronic device.

Although FIG. 2 illustrates a pair of magnets, it should be noted that a single magnet could also be used. For example, a single magnet may be located along a center of the outer edge 130 and along a center of the outer edge 132. In addition, although the pair of magnets are located on the opposing corners, the pair of magnets may be located elsewhere. For example, the pair of magnets 120 and 122 may be located anywhere along the outer edge 130. Similarly, the magnets 124 and 126 may be located anywhere along the outer edge 132. In another example, the pair of magnets 120 and 122 can be located anywhere between the outer edge 130 and the first groove 108 and the pair of magnets 124 and 126 can be located anywhere between the outer edge 132 and the second groove 110.

In addition, although magnets are provided as an example attaching mechanism, other types of attaching mechanisms may be used. For example, the attaching mechanism may be a clip that couples to the bezel of the display housing and the keyboard housing via an interference fit. The attaching mechanism may be edge that clips into a corresponding slot or opening along the bezel of the display housing and the keyboard housing, and so forth.

Figure 3:
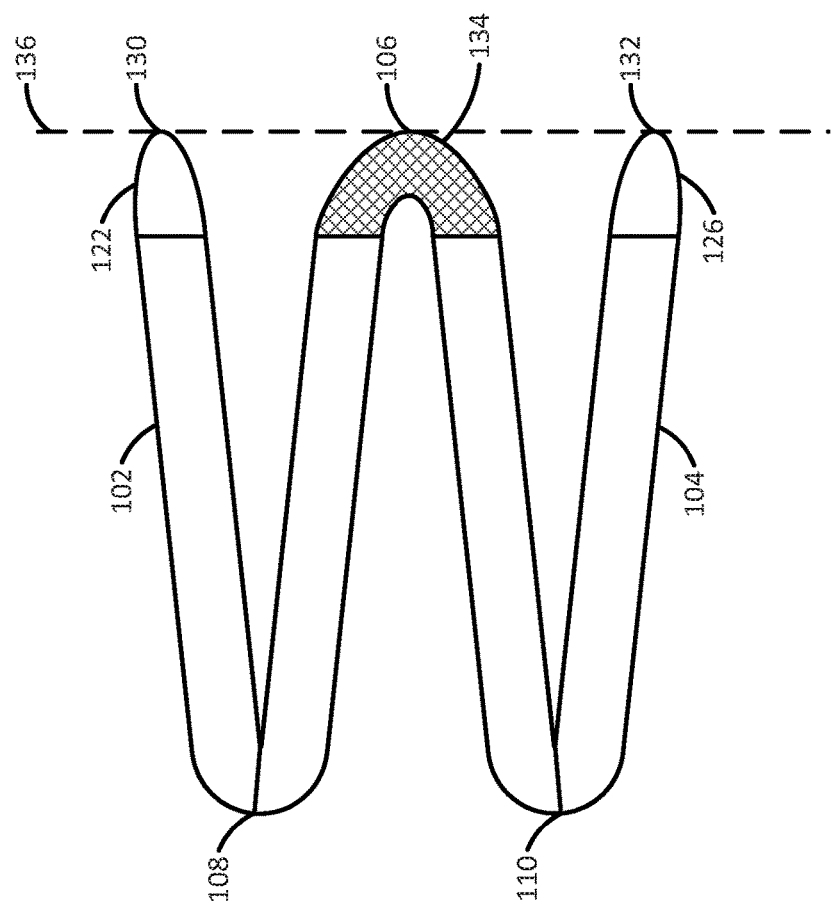
FIG. 3 is a block diagram of a side view of the example cover for an electronic device with a first cover folded in half and a second cover folded in half when a flexible spine is opened.

FIG. 3 illustrates a side view of the example cover 100 of the present disclosure in an open position. In one example, when the flexible spine 106 is in an open position, the first cover 102 may be folded in half along the first groove 108. In addition, the second cover 104 may be folded in half along the second groove 110.

When the flexible spine 106 is in an open position, an outer edge 134 of the flexible spine 106 may be aligned with the outer edge 130 of the first cover 102 and an outer edge 132 of the second cover 104. In other words, the outer edge 134 of the flexible spine 106, the outer edge 130 of the first cover 102, and the outer edge 132 of the second cover 104 may be aligned such that the edges 130, 132, and 134 touch a common plane 136. Said another way, the edges 130, 132, and 134 may be a same distance from the common plane 136.

In contrast, when the flexible spine 106 is in a closed position, the outer edge 134 may be a maximum distance away from the outer edge 130 of the first cover 102 and an outer edge 132 of the second cover 104. For example, the outer edge 130 and the outer edge 132 may be aligned on a first side and the outer edge 134 of the flexible spine 106 may be on second side opposite the first side.

FIG. 3 also illustrates the magnets 122 and 126 (the magnets 120 and 124 may be on the opposite side and not shown in the side view). Thus, the way the cover 100 folds, the cover 100 may remain attached to the electronic device even when the display housing of the electronic device is rotated 360 degrees, as shown in FIG. 5 and discussed below.

FIG. 4 illustrates an isometric side view of the example cover 100 removably coupled to an electronic device 402 that is opened in a laptop mode. In one example, the electronic device 402 may be a laptop computer. The electronic device 402 may include a display housing 404 and a keyboard housing 406. The display housing 404 may close against the keyboard housing 406 in a clamshell design. The display housing 404 may be rotated approximately 360 degrees from the closed position of approximately zero degrees. The display housing 404 may be opened in a variety of different angles around the 360 degrees into different modes. Notably, the electronic device 402 is not a tablet computer or a laptop computer that has a display housing that cannot rotate a full 360 degrees.

FIG. 4 illustrates the display housing opened at approximately 90 degrees in a laptop mode. For example, the keyboard housing 406 may rest on a surface top while the display housing 404 faces a user. The cover 100 may remain attached to the electronic device 402 when the electronic device 402 is opened in the laptop mode.

As discussed above, the first cover 102 may be removably coupled to a front bezel of the display housing 404 via the first pair of magnets 120 and 122. The second cover 104 may be removably coupled to a front bezel of the keyboard housing 406 via the second pair of magnets 124 and 126.

When the electronic device 402 is opened into a laptop mode, the first cover 102 may begin to move away from the display housing 404. The first cover 102 may begin to fold along the first folding groove 108. For example, the first folding groove 108 may begin to move towards the display housing 404 as it folds.

In one example, the second cover 104 may rest flush against a bottom of the keyboard housing 406 when the keyboard housing 406 is placed on a surface. However, if the electronic devices 402 is lifted, the second cover 104 may also begin to move away from the keyboard housing 406.

FIG. 5 illustrates a side view of the example cover 100 removably coupled to the electronic device 402 that is rotated 360 degrees in an inking mode. For example, the display housing 404 may rotate around a hinge 412. The display housing 404 may rotate approximately 360 degrees around as shown by an arrow 408. In one example, the display housing 404 may include a touch screen display. Thus, when the display housing 404 is rotated 360 degrees, the electronic device 402 may be in an inking mode.

FIG. 5 illustrates the flexible spine 106 in an open position as described above and also shown in FIG. 3. In other words, the flexible spine 106 is in an open position when the outer edge 130 of the first cover 102, the outer edge 134 of the flexible spine 106, and the outer edge 132 of the second cover 104 are aligned with the common plane 136. The flexible spine 106 may also be located between the outer edge 130 and the outer edge 132 in the open position.

Said another way, the flexible spine 106 may be in an open position when the outer edge 134 of the flexible spine 106 is located away from the hinge 412. When the flexible spine 106 is in a closed position, the flexible spine 106 may rest against the hinge 412.

When the flexible spine 106 is in the open position, the first cover 102 may be folded in half along the first folding groove 108. The first cover 102 may be folded in half on top of the second cover 104 that is also folded in half along the second folding groove 110. The display housing 404 may rest on top of the first cover 102 and the second cover 104 that are folded in half at a viewing angle 410.

In one example, the viewing angle 410 may be an angle that is measured between the display housing 404 and the keyboard housing 406 as illustrated by the angle 410 in FIG. 5. The viewing angle 410 may be between 5 degrees and 45 degrees. In one example, the viewing angle 410 may be between 15 degrees and 35 degrees. In one example, the viewing angle 410 may be approximately 20-25 degrees.

In other words, when the flexible spine 106 is in an open position, the first cover 102 and the second cover 104 may be folded in half to provide the viewing angle 410 for the display housing 404. The viewing angle 410 may provide an improved angle to write on the touchscreen display or to interact with the touch screen display in the display housing 404.

In one example, the first cover 102 and the second cover 104 may have a thickness 138. An amount of the thickness 138 may determine the viewing angle 410. For example, the smaller the thickness 138 the smaller the viewing angle 410 would be. The larger the thickness 138, the larger the viewing angle 410 would be. Thus, the thickness 138 of the first cover 102 and the second cover 104 may be selected to provide an optimal viewing angle 410.

In one example, the cover 100 may be manufactured with different thicknesses 138 to provide different viewing angles 410. Thus, some users who prefer a larger viewing angle may buy covers 100 that have a larger thickness 138. Other users who prefer a smaller viewing angle may buy covers 100 that have a smaller thickness 138.

In one example, the first cover 102 may include multiple first folding grooves 108 and the second cover 104 may include multiple second folding grooves 110. Thus, the viewing angle 410 may be adjusted based on a number times the first cover 102 and/or the second cover 104 are folded. For example, folding the first cover 102 on one folding groove 108 may have a first viewing angle 410, folding the first cover 102 on two folding grooves 108 may have second viewing angle 410, folding the first cover 102 on three folding grooves 108 may have a third viewing angle 410, and so forth. Thus, the cover 100 may be designed with adjustable viewing angles 410.

Notably, when the display housing 404 of the electronic device 402 is rotated approximately 360 degrees, the cover 100 may remain coupled to the electronic device 402. Thus, the cover 100 may be designed to stay coupled to the electronic device 402 in any orientation or mode without removal. However, the cover 100 may be designed to be removably coupled such that the user may easily remove the cover 100 from the electronic device 402.

Thus, the cover 100 of the present disclosure provides protection for electronic devices that can rotate approximately 360 degrees without being removed when opened. The cover 100 may provide protection for the electronic device 402, while also providing an aesthetic appeal. As noted above, the cover 100 may be designed with a variety of different colored soft outer shells and/or decorative designs.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

The invention claimed is:

1. A cover for electronic devices, comprising:
   a first cover, wherein the first cover includes a first folding groove;
   a second cover, wherein the second cover includes a second folding groove;
   a flexible spine coupled to the first cover and the second cover, wherein the first cover is to fold in half along the first folding groove and the second cover is to fold against the second folding groove to set a viewing angle of a display housing of an electronic device when the flexible spine is moved into an open position, wherein the open position comprises when the electronic device coupled to the first cover and the second cover is rotated to greater than 180 degrees and the viewing angle is measured between the display housing of the electronic device and a keyboard housing of the electronic device;
   a first pair of magnets coupled to the first cover to secure the first cover to the display housing of the electronic device; and
   a second pair of magnets coupled to the second cover to secure the second cover to the keyboard housing of the electronic device.

2. The cover for electronic devices of claim 1, wherein first folding groove is located approximately in a middle of the first cover.

3. The cover for electronic devices of claim 2, wherein the first folding grove runs from edge-to-edge.

4. The cover for electronic devices of claim 1, wherein second folding groove is located approximately in a middle of the second cover.

5. The cover for electronic devices of claim 4, wherein the second folding grove runs from edge-to-edge.

6. The cover for electronic devices of claim 1, wherein the first cover has a first thickness and the second cover has a second thickness to provide the viewing angle of the display housing of the electronic device when the display housing is rotated greater than 180 degrees into an inking mode.

7. The cover for electronic devices of claim 1, wherein magnets of the first pair of magnets are on opposing corners of the first cover and magnets of the second pair of magnets are on opposing corners of the second cover.

8. The cover for electronic devices of claim 1, wherein the first cover includes a plurality of first folding grooves and the second cover includes a plurality of second folding grooves, wherein the viewing angle is adjustable based on a number of times the first cover is folded along one or more of the plurality of first folding grooves and a number of times the second cover is folded along one or more of the plurality of second folding grooves.

9. A cover for an electronic device, comprising:
   a first cover;
   a second cover;
   a flexible spine coupled to the first cover and the second cover, wherein the first cover is to fold in half on top of the second cover that is folded in half to provide a viewing angle of approximately 5 degrees to 45 degrees for the electronic device when the flexible spine is moved to an open position, wherein the open position comprises when an electronic device coupled to the first cover and the second cover is rotated to greater than 180 degrees and the viewing angle is measured between a display housing of the electronic device and a keyboard housing of the electronic device;
   a first pair of magnets coupled to the first cover to secure the first cover to the display housing of the electronic device; and
   a second pair of magnets coupled to the second cover to secure the second cover to the keyboard housing of the electronic device.

10. The cover for an electronic device of claim 9, wherein the first cover includes a first folding groove and the second cover includes a second folding groove.

11. The cover for an electronic device of claim 9, wherein the electronic device comprises a laptop computer.

12. The cover for an electronic device of claim 9, wherein the viewing angle is for the display housing of the electronic device when the display housing is rotated greater than 180 degrees.

13. A cover for an electronic device, comprising
a first cover having a first folding groove and a first pair of magnets to secure the first cover to a display housing of an electronic device;
a second cover having a second folding groove and a second pair of magnets to secure the second cover to a keyboard housing of the electronic device; and
a flexible spine coupled to the first cover and the second cover, wherein the first cover and the second cover are to fold in half to set a viewing angle of the display housing of the electronic device when the flexible spine is in an open position such that an edge of the first cover, an edge of the second cover, and an edge of the flexible spine are aligned, wherein the open position comprises when the electronic device is rotated to greater than 180 degrees and the viewing angle is measured between the display housing of the electronic device and the keyboard housing of the electronic device.

14. The cover for the electronic device of claim 13, wherein magnets of the first pair of magnets are located on opposing corners to attach to a front bezel of the display housing of the electronic device and magnets of the second pair of magnets are located on opposing corners to attach to a front bezel of the keyboard housing.

15. The cover for the electronic device of claim 13, wherein the viewing angle of the display housing is provided by the first cover and the second cover when folded in half.

* * * * *